United States Patent
Lehner

(10) Patent No.: US 10,102,751 B2
(45) Date of Patent: Oct. 16, 2018

(54) INCLINATION DETECTION IN TWO-WHEELERS

(71) Applicant: Robert Bosch GmbH, Stuttgart (DE)

(72) Inventor: Philipp Lehner, Muehlacker (DE)

(73) Assignee: ROBERT BOSCH GMBH, Stuttgart (DE)

( * ) Notice: Subject to any disclaimer, the term of this patent is extended or adjusted under 35 U.S.C. 154(b) by 82 days.

(21) Appl. No.: 15/342,306

(22) Filed: Nov. 3, 2016

(65) Prior Publication Data

US 2017/0162055 A1 Jun. 8, 2017

(30) Foreign Application Priority Data

Dec. 3, 2015 (DE) .................. 10 2015 224 171

(51) Int. Cl.
*G06K 9/00* (2006.01)
*G08G 1/16* (2006.01)
(Continued)

(52) U.S. Cl.
CPC ............ *G08G 1/166* (2013.01); *B60Q 9/008* (2013.01); *B60W 30/0956* (2013.01); *B60W 50/14* (2013.01); *G01C 9/06* (2013.01); *G06K 9/00* (2013.01); *G06K 9/00791* (2013.01); *G06K 9/00805* (2013.01); *G06K 9/3208* (2013.01); *G06T 7/0081* (2013.01); *G06T 7/20* (2013.01); *G08G 1/04* (2013.01); *G08G 1/056* (2013.01); *G01C 2009/066* (2013.01)

(58) Field of Classification Search
CPC ..... B60W 2420/42; G08G 1/166; B60R 1/00; B60R 2300/304; B60R 2300/307

USPC ......... 382/104, 103; 348/148; 340/436, 435, 340/453, 901, 903; 701/523, 408, 300, 701/96; 180/274; 280/730.1; 296/187.04

See application file for complete search history.

(56) References Cited

U.S. PATENT DOCUMENTS 7,966,127 B2 * 6/2011 Ono ............... B60R 21/0134
701/300
8,054,201 B2 * 11/2011 Okugi .............. B60R 1/00
340/901
(Continued)

FOREIGN PATENT DOCUMENTS

DE 102004021590 A1 12/2005
DE 102012207981 A1 11/2013
DE 102014205070 A1 9/2015

OTHER PUBLICATIONS

Schlipsing, et al. "Roll Angle Estimation for Motorcycles: Comparing Video and Inertial Sensor Approaches", Intelligent Vehicles Symposium (2012), pp. 500-505.

*Primary Examiner* — Charlotte M Baker
(74) *Attorney, Agent, or Firm* — Norton Rose Fulbright US LLP; Gerard Messina

(57) ABSTRACT

A method for operating a vehicle equipped with a surroundings sensor system is provided. In the method, at least one preceding and/or oncoming two-wheeler is detected at least as a function of data of the surroundings sensor system. In addition, an angle of inclination of the two-wheeler is ascertained at least as a function of data of the surroundings sensor system and a movement path of the two-wheeler is predicted based on the ascertained angle of inclination. The operation of the vehicle takes place in this case based on the predicted movement path.

15 Claims, 3 Drawing Sheets

(51) Int. Cl.
  *B60W 30/095* (2012.01)
  *G01C 9/06* (2006.01)
  *G06T 7/00* (2017.01)
  *G06T 7/20* (2017.01)
  *G08G 1/04* (2006.01)
  *G08G 1/056* (2006.01)
  *B60W 50/14* (2012.01)
  *B60Q 9/00* (2006.01)
  *G06K 9/32* (2006.01)

(56) References Cited

U.S. PATENT DOCUMENTS

| | | | |
|---|---|---|---|
| 8,933,797 B2* | 1/2015 | Deigmoller | G06T 7/2006 340/435 |
| 9,063,546 B2* | 6/2015 | Hauler | G05D 1/0212 |
| 2013/0282268 A1 | 10/2013 | Goerick et al. | |

* cited by examiner

INCLINATION DETECTION IN TWO-WHEELERS

CROSS REFERENCE

The present application claims the benefit under 35 U.S.C. § 119 of German Patent Application No. DE 102015224171.8 filed on Dec. 3, 2015, which is expressly incorporated herein by reference in its entirety.

BACKGROUND INFORMATION

The present invention relates to a driver assistance system for predicting travel trajectories of other vehicles.

A device and a method for detecting an angle of inclination of a two-wheeler during travel using a sensor is described in German Patent Application No. DE 102004021590 A1, in which accelerations are measured along the vertical axis of the two-wheeler by a vertical acceleration sensor. The angle of inclination is determined via the ratio of the measured acceleration to the acceleration of gravity. A method for level regulation is activated or deactivated as a function of the angle of inclination of the two-wheeler.

SUMMARY

According to the present invention, a method is provided for operating a vehicle equipped with a surroundings sensor system. In the method, at least one preceding and/or oncoming two-wheeler is detected at least on the basis of data of the surroundings sensor system. In addition, an angle of inclination of the two-wheeler is ascertained at least on the basis of data of the surroundings sensor system and a movement path of the two-wheeler is predicted based on the ascertained angle of inclination. The operation of the vehicle takes place in this case based on the predicted movement path.

The method according to the present invention offers the advantage that the movement path of detected two-wheelers may be predicted, whereby a better analysis of driving situations is possible. For example, a situation analysis in complex scenarios, such as at an intersection in a city center, may be improved for automated driving.

Upon the detection of the two-wheeler, the driver may also be detected in each case. It may vary depending on the application and the sensor system used whether only the two-wheeler or the two-wheeler including a driver is ascertained.

Two-wheelers may be understood as all vehicles having two wheels, such as bicycles, scooters, mopeds, motorized bicycles, or motorcycles. All common sensors and detection means may be used as the surroundings sensor system, including cameras, stereo video cameras, ultrasonic sensors, radar sensors, LIDAR, and laser.

In another specific embodiment of the method, the optical flow is ascertained on the basis of image sequences recorded with the aid of the surrounding sensor system, which is designed as a camera, to detect the two-wheeler.

The ascertained optical flow may advantageously contribute to segmenting objects, thus enabling a targeted search of object classes in the image area. With the aid of the optical flow, the segmenting according to colors and textures and the assignment of points to objects may be optimized. Typical object classes would be pedestrians, passenger automobiles, trucks, bicycle riders, motorcycle riders, strollers, traffic signs, roads and further objects which occur in traffic, such as road users, buildings, infrastructure elements, structures, or landscape features.

In one advantageous specific embodiment of the method, a proper motion of the vehicle is taken into consideration when ascertaining the angle of inclination.

This specific embodiment offers the advantage that by taking into consideration the proper motion, more accurate ascertainment of the angle of inclination is possible. The proper motion may be obtained in this case, for example, via measurement data which represent the roll angle, such as camera and/or acceleration and/or rotation rate sensor data. In addition, the roadway surface may be determined on the basis of the proper motion of the vehicle and on the basis of visual features of the road in a video image. This may also advantageously contribute to improved segmenting of objects in an image recorded using a camera.

In another specific embodiment of the method, the angle of inclination is ascertained on the basis of at least two reference points on the two-wheeler, which are detected by the surrounding sensor system.

This specific embodiment offers the advantage that a rapid and simple determination of the angle of inclination may be carried out. On the basis of at least two reference points on the two-wheeler, for example, the base point, at which the tire hits the roadway, and a front or tail light, an inclination straight line and therefore the angle of inclination of the two-wheeler may be determined. Arbitrary further points also come into consideration as reference points, such as tires, fender, suspension, foot rests, handlebars, a license plate, the position of a driver, saddlebags, the fuel tank, and further typical features of the two-wheeler to be analyzed. These reference points may be ascertained, for example, with the aid of conventional image processing methods. In addition, the posture of the driver on the two-wheeler may also be analyzed and taken into consideration in the determination of the movement path.

In another specific embodiment of the method, the surroundings sensor system includes a camera. In this case, specific pixels of a digital image recorded with the aid of the camera are associated with the two-wheeler to ascertain the angle of inclination.

An advantage of this specific embodiment is that object detection is carried out with the aid of camera data, which separate the two-wheeler from the surroundings. In the recorded camera image, individual areas are associated with the two-wheeler in this case. In this way, a further analysis of the position of the two-wheeler and/or a determination of the angle of inclination is possible.

In another specific embodiment of the method, a mean column value of the pixels associated with the two-wheeler is determined in each of at least two lines of the image. The angle of inclination of the two-wheeler is subsequently ascertained on the basis of the mean column values.

This specific embodiment of the method offers the advantage that a very rapid determination of the angle of inclination is possible by way of the line-by-line read-out of the image. All lines do not have to be read out in this case, since two determined mean column values are already sufficient to determine an inclination straight line or the angle of inclination of the two-wheeler on the basis of these column values. The number of the ascertained column values may be selected arbitrarily in this case, or may be adapted to the recorded image.

In one particularly advantageous specific embodiment of the method, roadway turnoffs are ascertained to ascertain the predicted movement path. A roadway approached by the two-wheeler is predicted on the basis of the angle of inclination of the two-wheeler at at least one ascertained roadway turnoff.

This specific embodiment of the method offers the advantage that it may be predicted at an ascertained or known roadway turnoff, solely on the basis of the angle of inclination of the two-wheeler, which roadway will be approached by the two-wheeler and/or the driver of the two-wheeler. Roadway turnoffs are understood in this case as all road courses at which it is possible for a vehicle and/or a driver to travel on different roadways and/or to leave the presently traveled roadway. These include in particular all possible intersection situations, roundabouts, entries and exits to roads, approaches to parking lots and/or stopping bays and/or an emergency lane and turnoffs to forest tracks and/or dirt roads. Situations in which a two-wheeler could execute a turning maneuver may also be taken into consideration.

The roadway turnoffs may be detected with the aid of the surroundings sensor system and/or determined on the basis of map material, for example, which may be provided in the form of a digital map or received by the vehicle, for example.

In another specific embodiment of the method, the velocity of the two-wheeler is determined to predict the movement path. The determination is carried out in this case in particular with the aid of the data of the surroundings sensor system and additionally or alternatively on the basis of the angle of inclination and input map information.

This specific embodiment of the method offers the advantage that the velocity of the two-wheeler is known in addition to the angle of inclination. In this way, it is possible to predict the movement path of the two-wheeler more exactly.

If items of map information are provided, from which the curvature of the roadway emerges, the velocity of the two-wheeler may be estimated on the basis of the angle of inclination. In this way, a sensor system which may directly measure the velocity, or a derivation of the velocity via multiple measuring cycles, is not necessary. This is possibly an important requirement to be able to implement collision-avoidance assistance systems using cost-effective sensor systems.

In another specific embodiment of the present invention, the predicted movement path includes a travel trajectory, which is predicted on the basis of the ascertained angle of inclination and the ascertained velocity.

This specific embodiment of the method offers the advantage that a very accurate prediction of the travel trajectory of the two-wheeler is possible with the aid of the angle of inclination and the velocity of the two-wheeler. The position of the two-wheeler at different points in time may be predicted with the aid of this trajectory. This information may be used beneficially to analyze the traffic situation and take measures in case of a hazard.

In one advantageous specific embodiment of the method, the operation of the vehicle provides an activation of a warning device and/or an activation of at least one actuator, which intervenes in the driving dynamics of the vehicle. It is ascertained in this case on the basis of the predicted movement path of the two-wheeler whether the two-wheeler is headed toward a lane traveled by the vehicle.

This specific embodiment of the method offers the advantage that, on the basis of the present travel situation, a warning signal for a driver and/or further vehicles and/or further drivers and/or road users may be generated with the aid of the warning device if a hazardous situation exists. Furthermore, it is possible that an activation is carried out of at least one actuator which intervenes in the driving dynamics of the vehicle. For example, if it is determined that the two-wheeler is headed toward a lane traveled by the vehicle and that a risk of a collision exists, emergency braking and/or an evasive maneuver and/or another intervention in the driving dynamics may thus be carried out with the aid of the method, to avoid a collision and/or to reduce possible damage. The lane traveled by the vehicle may be determined in this case, for example, with the aid of the surroundings sensor system and/or items of map information. For more exact analysis of the traffic situation and to determine whether a collision is actually imminent, the trajectory of the vehicle may also be determined. This may be compared to the predicted movement path and optionally to the travel trajectory of the two-wheeler, if it was determined.

Furthermore, a device for operating a vehicle equipped with a surroundings sensor system is provided. The device is designed to detect at least one preceding and/or oncoming two-wheeler and to predict a movement path of the two-wheeler. An angle of inclination of the two-wheeler is detected as a function of data of the surroundings sensor system to predict the movement path. The operation of the vehicle is carried out based on the predicted movement path, the movement path being predicted with the aid of the present invention.

In addition, a computer program is provided, which is configured to carry out all steps of the provided method.

DETAILED DESCRIPTION OF EXAMPLE EMBODIMENTS

Figure 1:
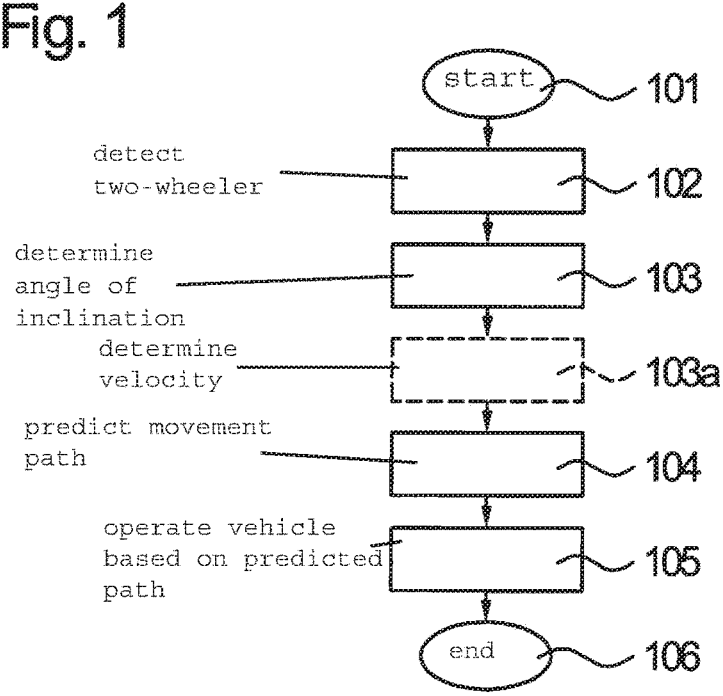
FIG. 1 shows a schematic method sequence.
Figure 2:
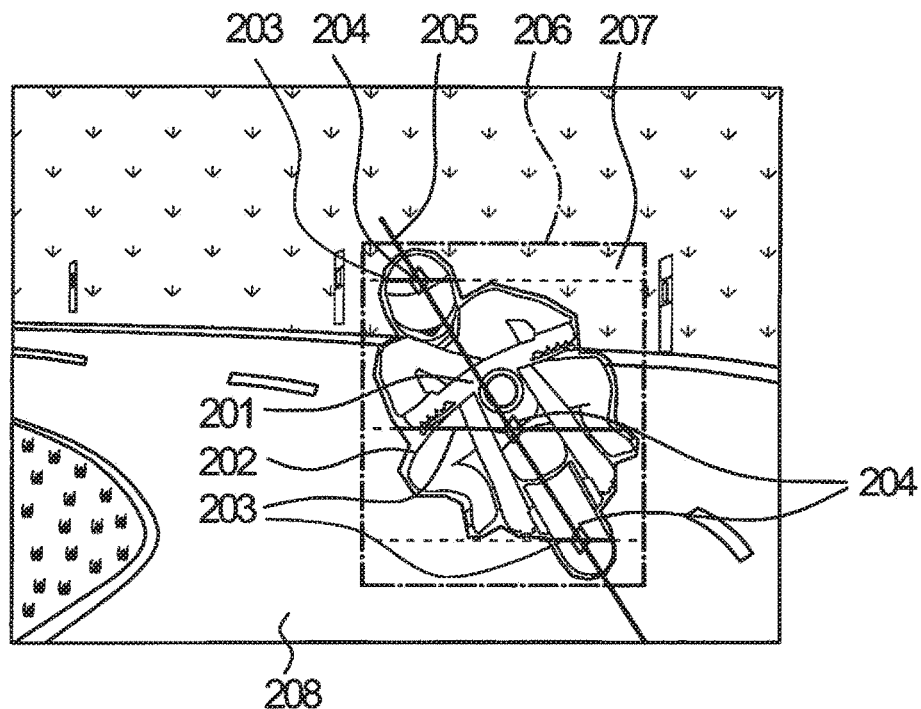
FIG. 2 shows an oncoming motorcycle in a turning position.

In the following exemplary embodiment, a vehicle is equipped with a surroundings sensor system, in particular a camera, and a device which enables operation of the vehicle. The device is designed to detect two-wheelers, to determine the angle of inclination thereof, and to predict a movement path of the two-wheelers on the basis of the angle of inclination. The device may operate the vehicle based on the predicted movement path. To predict the movement path, a method is carried out on the device with the aid of a computer program, the schematic sequence of which is shown in FIG. 1. The method starts in step 101.

In step 102, a preceding or oncoming two-wheeler 201, 401, 501, is initially detected with the aid of a video image recorded using the camera and with the aid of conventional classification methods (for example, neuronal networks, decision trees, Viola-Jones). Roadway surface 402 may be estimated on the basis of the proper motion of the vehicle and on the basis of visual features of road 208 in the video image. For this purpose, for example, segmenting methods may be used, which extract image areas which correspond to the roadway surface on the basis of the texture. Alternatively thereto, the flow vectors calculated from an image sequence may be compared to those in the case of the expected movement of the ground area, which may be ascertained from the viewpoint of the camera and with known proper motion of the vehicle. Image areas, the flow vectors of which approximately correspond to the ground area moved over relative to the vehicle, may be associated with the ground surface or roadway surface.

The optical flow which is determined on the basis of image sequences may provide an important contribution to the segmenting of objects and therefore also to the targeted search for object classes in image areas. For the objects recognized in the image, corresponding image areas 207, 407 are also determined and indicated as a rectangle (bounding box) 206, 406. In this exemplary embodiment, a motorcycle 201, 401 is detected, which is accordingly provided with a bounding box 206, 406. All pixels which are associated with the object, i.e., not the "background," are determined in image area 207, 407.

Conventional methods of image processing for segmenting, for example, threshold value methods or the Felzenszwalb-Huttenlocher algorithm may be used for this purpose. The latter is an edge-oriented method for segmenting an image into objects. The algorithm firstly lays an edge between each two adjacent pixels of an image, which are weighted according to the features such as the difference in brightness and color of the particular adjoining pixels. Subsequently, image segments are formed from each individual pixel, which are fused in such a way that the difference between the edge weightings within a segment remains preferably small and becomes preferably large between adjacent segments.

In step 103, angle of inclination 303 of two-wheeler 201, 401 is subsequently determined. For each image line 203 of image area 207, 407, a type of "center point" or a mean column value 204 is determined for this purpose, in that the median of the horizontal position of all pixels 202 associated with the object is determined. Finally, a straight line 205, 405 through mean column values 204 may be determined by equalization. Outliers may optionally be filtered out by the iterative RANSAC method and straight line 205, 405 may be determined even better. The inclination of straight line 205, 405 with respect to the horizontal reflects the inclination of motorcycle 201, 401, whereby angle of inclination 303 of motorcycle 201, 401 may be determined.

The described method for determining angle of inclination 303 does not have to be applied to all image lines 203 (dashed plus solid line 203). It is sufficient if at least two image lines 203 observed distributed over the vertical extension of bounding box 206, 406 and the pixels associated with the two-wheeler therein (solid line 202) and, mean column values 204 are determined by these pixels 202 (solid line 203). This reduces the computing effort significantly, with nearly the same benefit.

If items of 3D information about the surroundings, for example, in the form of 3D point clouds, are provided instead of image points, as may be generated, for example, with the aid of laser scanners or stereo cameras, segmenting of the object may be carried out even more reliably by way of the distances to other objects and the elevation of ground area/roadway level 208, which is easy to determine. The determination of inclination straight line 205, 405 may be carried out similarly to the above-described method via "center points."

Figure 4:
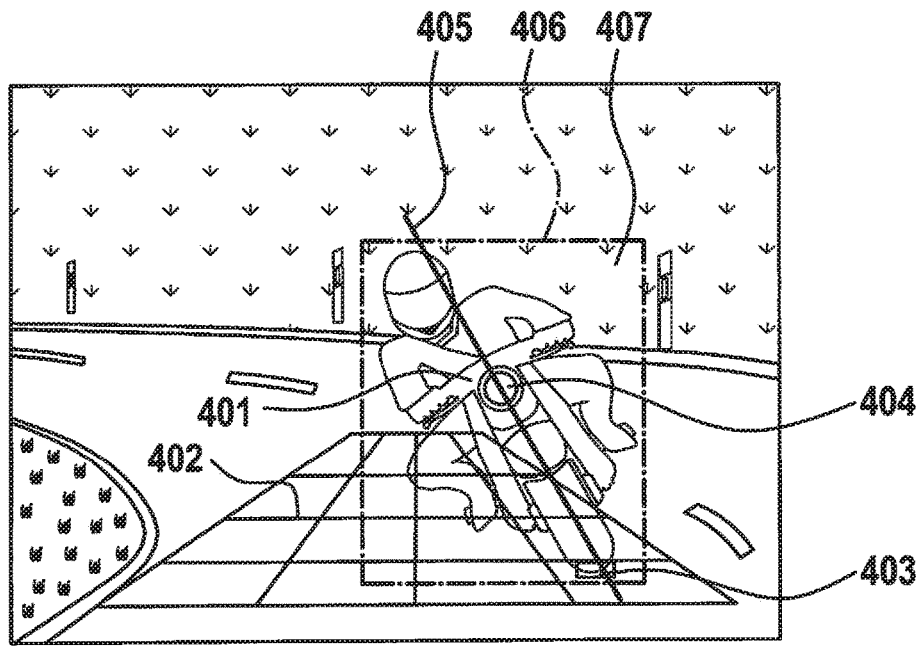
FIG. 4 shows an option for determining the angle of inclination.

Alternatively, the determination of angle of inclination 303 in step 103 may also be ascertained on the basis of at least two reference points 403, 404 on two-wheeler 201, 401 which are detected by the surroundings sensor system. In this exemplary embodiment, as shown in FIG. 4, base point 403 and headlight 404 are selected as reference points. Base point 403, the contact point of the two-wheeler on the roadway, is searched for in the lower area of relevant image section 207, 407. With known distance of two-wheeler 201, 401 (for example, by measurement with the aid of radar or a stereo camera) and the knowledge or an estimation of roadway 201, the horizontal image area may be determined, in which base point 403 is located.

Subsequently, by way of conventional image processing methods (for example, blob detection), the position of a headlight 404 and/or a taillight of two-wheeler 201, 401 in the image is ascertained. Delimited and coherent areas are determined in the image, the image points of which are similar, i.e., have similar color and/or brightness values. In the case of motorcycles, it is also required that light 404 is turned on during the day, which therefore simplifies recognition in the image. Inclination straight line 205, 405 and therefore angle of inclination 303 may be approximately determined by base point 403 and light position 404.

In step 104, a movement path of two-wheeler 201, 401, 501 is predicted on the basis of angle of inclination 303. The velocity of two-wheeler 201, 401, 501 is not necessarily required for predicting a roadway 208, 502, 503 approached by two-wheeler 201, 401, 501. If two-wheeler 201, 401, 501 is significantly inclined, i.e., angle of inclination 303 is accordingly large, it may be concluded therefrom that two-wheeler 201, 401, 501 is in motion (at absolute velocity $|v|>0$) on a curved path (having curvature $|\kappa|>0$) and the direction in which this curvature $\kappa$ points.

For the judgment as to whether the two-wheeler is turning off, for example, i.e., which roadway is approached, this information is already sufficient in many applications. Such a turnoff classification already enables an interpretation of the traffic situation. A combination with items of information about roadway turnoffs and/or the roadway course from a map and the assumption that two-wheeler 201, 401, 501 is traveling on a road 208 and/or a bicycle path, enables a good prediction of the movement path of two-wheeler 201, 401, 501.

The roadway turnoffs may be detected with the aid of the surroundings sensor system and/or determined on the basis of map material, for example, which may be provided in the form of a digital map or may be received by the vehicle, for example Specific threshold values may be established for the prediction of the approached roadway, from which a specific roadway is predicted. These threshold values may be fixedly predefined and/or may be adapted to the particular road course and the detected roadway turnoffs. Depending on the angle at which, for example, a side road intersects the road presently traveled by two-wheeler 201, 401, 501, the threshold value for angle of inclination 303, from which traveling of the side road is predicted, may be changed.

Figure 5:
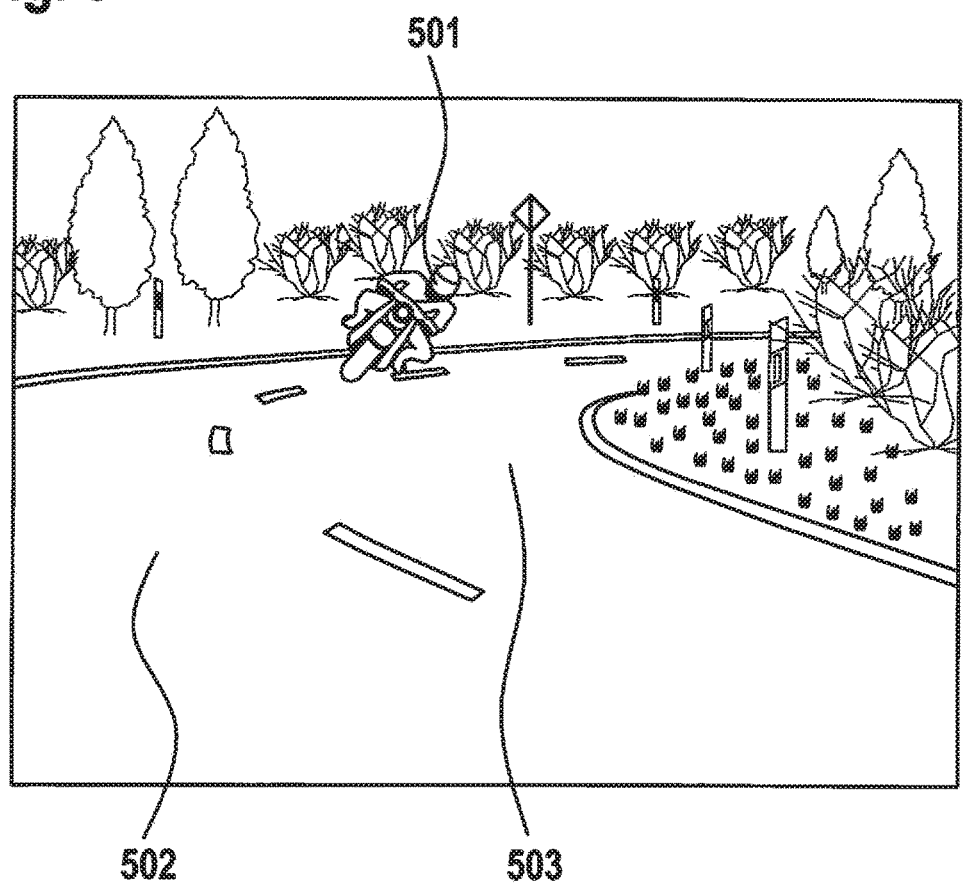
FIG. 5 shows a motorcycle in a turn.

On the basis of angle of inclination 303 and the position of two-wheeler 201, 401, 501, it may already be derived in some travel situations (see FIG. 5) whether two-wheeler 501 will change road side 502, 503 in the further course and will move onto road side 503 of the oncoming traffic.

For a more exact prediction of the movement path of a two-wheeler 201, 401, 501, the velocity of two-wheeler 201, 401, 501 may be determined in an optional step 103*a*.

The velocity may be measured directly, for example, using radar sensors included in the surroundings sensor system, via the analysis of Doppler frequencies, and/or ascertained indirectly via multiple measurements of the object distance (distance of the vehicle to two-wheeler 201, 401, 501) (time tracking). These measurements may be carried out, for example, using a camera and/or a stereo video camera, which may also be included in the surroundings sensor system. To increase the accuracy, the proper motion of the vehicle may additionally be taken into consideration, which may be ascertained, for example, via odometry or inertial navigation. For the inertial navigation, data from an inertial navigation system are used, an inertial navigation system being understood as a 3D measuring system including acceleration sensors and gyroscopic stabilization and/or rotation rate sensors. An item of information representing a roll angle and therefore also the rolling movement of the sensor system may also be taken into consideration for compensation.

Alternatively or additionally, the velocity of two-wheeler 201, 401, 501 may also be determined with the aid of an input item of map information. The map information may contain in particular an item of information about the route traveled by two-wheeler 201, 401, 501, for example, about the course of curves which two-wheeler 201, 401, 501 negotiates and/or information about the traffic situation at intersections, turnoff possibilities, traffic signals, rights-of-way, etc. If the map information of the map is sufficiently accurate so that curvature κ of the road course may be ascertained on the basis of the map information, the velocity of two-wheeler 201, 401, 501 may additionally be determined and/or estimated with the aid of the following formula $$\tan\alpha = \frac{F_Z}{F_G} = \frac{kv^2}{g}.$$

Figure 3:
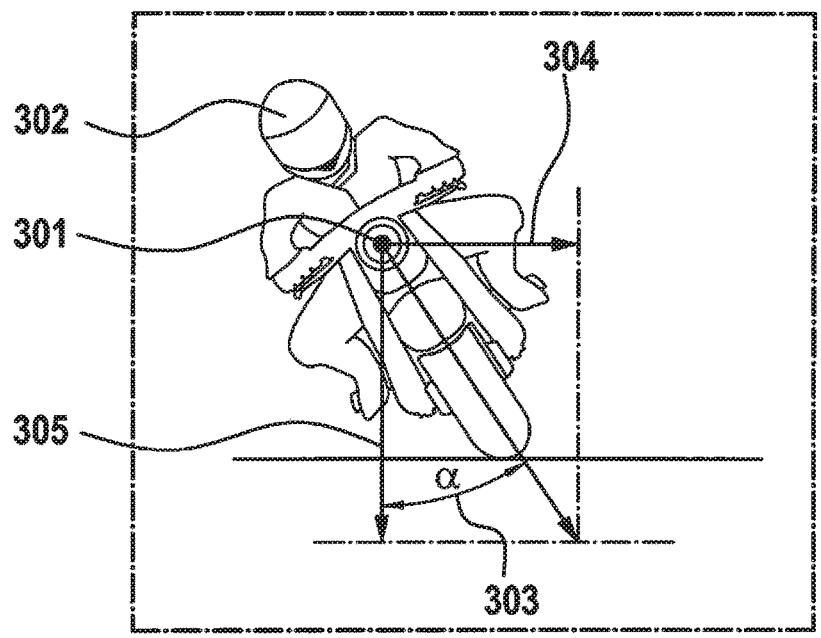
FIG. 3 shows a schematic force effect on a motorcycle.

The formula applies approximately during stable curve negotiation of a two-wheeler 201, 401, 501. In this case, α corresponds to the angle of inclination, $F_Z$ 304 to the centrifugal force, $F_G$ 305 to the gravitational force, g to the acceleration of gravity, and v to the velocity. The forces each engage at center of gravity 301 of two-wheeler 201, 401, 501, including a possibly present driver 302 (see FIG. 3). On the basis of only a single image and the knowledge of road curvature κ, the velocity of two-wheeler 201, 401, 501 may be determined. This is an important requirement for being able to implement the collision-avoidance assistance systems using cost-effective sensor systems and to enable rapid and early decisions for assistance systems such as an emergency braking assistant.

If both angle of inclination 303 and the velocity of two-wheeler 201, 401, 501 are known, the travel trajectory of two-wheeler 201, 401, 501 may be determined from these values. Using this, even more exact statements may be made about the future movement path of two-wheeler 201, 401, 501.

In step 105, the vehicle is operated based on the predicted movement path of two-wheeler 201, 401, 501.

For example, if it may be concluded from the predicted movement path that two-wheeler 501 will travel toward the lane of the vehicle and a collision is imminent, a warning signal may be transmitted to the driver of the vehicle and/or further road users. Alternatively or additionally, an actuator may also be activated, which intervenes in the driving dynamics of the vehicle. For example, an automated braking and/or evasive maneuver may be carried out. The function may therefore also be used in highly automated or fully automated vehicles.

It may also be predicted whether the risk of an accident is imminent, for example, by way of a comparison between the curvature of the ascertained travel trajectory of two-wheeler 201, 401, 501 and the curvature of the roadway course, which is determined, for example, via camera data or is provided in the form of navigation maps.

The method ends in step 106.

What is claimed is:

1. A method for operating a vehicle equipped with a surroundings sensor system, the method comprising:
    detecting at least one of a preceding and an oncoming two-wheeler, the detecting being based on data of the surroundings sensor system;
    ascertaining an angle of inclination of the two-wheeler at least as a function of data of the surroundings sensor system, wherein the angle of inclination is formed by an inclination with respect to horizontal of a straight line;
    predicting a movement path of the two-wheeler based on the ascertained angle of inclination; and
    operating the vehicle based on the predicted movement path.

2. The method as recited in claim 1, wherein an optical flow is ascertained on the basis of image sequences recorded with the aid of the surroundings sensor system to detect the two wheeler, the surrounding sensor system including a camera.

3. The method as recited in claim 1, wherein a proper motion of the vehicle is taken into consideration in the ascertaining of the angle of inclination.

4. The method as recited in claim 1, wherein the angle of inclination is ascertained based on at least two reference points on the two-wheeler, which are detected by the surroundings sensor system.

5. The method as recited in claim 1, wherein the surroundings sensor system includes a camera, and specific pixels of a digital image recorded using the camera are associated with the two-wheeler to ascertain the angle of inclination.

6. The method as recited in claim 5, wherein a mean column value of the pixels associated with the two-wheeler is determined in at least two lines of the image and the angle of inclination is ascertained on the basis of the mean column values.

7. The method as recited in claim 1, wherein, to ascertain the predicted movement path, roadway turnoffs are ascertained and, with respect to at least one ascertained roadway turnoff, a roadway approached by the two-wheeler is predicted based on the angle of inclination.

8. The method as recited in claim 1, further comprising:
    determining a velocity of the two-wheeler is determined to predict the movement path, the velocity being determined at least one of: with the aid of the data of the surroundings sensor system, and on the basis of the angle of inclination and an input item of map information.

9. The method as recited in claim 8, wherein the predicted movement path includes a travel trajectory which is predicted on the basis of the ascertained angle of inclination and the ascertained velocity.

10. The method as recited in claim 1, further comprising:
    ascertaining on the basis of the predicted movement path of the two-wheeler whether the two-wheeler will move onto a lane traveled by the vehicle;
    wherein the operation of the vehicle includes at least one of activating a warning device, and activating at least one actuator which intervenes in the driving dynamics of the vehicle.

11. A device for operating a vehicle equipped with a surroundings sensor system, the device being designed to:
    detect at least one of a preceding and an oncoming two-wheeler;

predict a movement path of the two-wheeler, wherein, the movement path is predicted as a function of an angle of inclination of the two-wheeler which is detected as a function of data of the surrounding sensor system, wherein the angle of inclination is formed by an inclination with respect to horizontal of a straight line; and operate the vehicle based on the predicted movement path.

12. A non-transitory computer readable storage medium on which is stored a computer program for operating a vehicle equipped with a surroundings sensor system, the computer program, when executed by a processor, causing the processor to perform:

detecting at least one of a preceding and an oncoming two-wheeler, the detecting being based on data of the surroundings sensor system;

ascertaining an angle of inclination of the two-wheeler at least as a function of data of the surroundings sensor system, wherein the angle of inclination is formed by an inclination with respect to horizontal of a straight line;

predicting a movement path of the two-wheeler based on the ascertained angle of inclination; and operating the vehicle based on the predicted movement path.

13. The method as recited in claim 1, wherein the straight line contains at least two reference points on the two-wheeler, and wherein the reference points include a contact point of the two-wheeler with a roadway and a point on a headlight of the two-wheeler.

14. The device as recited in claim 11, wherein the straight line contains at least two reference points on the two-wheeler, and wherein the reference points include a contact point of the two-wheeler with a roadway and a point on a headlight of the two-wheeler.

15. The non-transitory computer readable storage medium as recited in claim 12, wherein the straight line contains at least two reference points on the two-wheeler, and wherein the reference points include a contact point of the two-wheeler with a roadway and a point on a headlight of the two-wheeler.

* * * * *